United States Patent [19]
Feldman et al.

[11] Patent Number: 5,309,282
[45] Date of Patent: May 3, 1994

[54] HIGH STABILITY WAVEFRONT REFERENCE SOURCE

[75] Inventors: Mark Feldman, Pleasanton; Daniel J. Mockler, Tracy, both of Calif.

[73] Assignee: The United States of America as represented by the United States Department of Energy, Washington, D.C.

[21] Appl. No.: 914,325

[22] Filed: Jul. 17, 1992

[51] Int. Cl.$^5$ .................. G02B 27/30; G02B 7/00; G02B 6/00
[52] U.S. Cl. .................................. 359/641; 359/503
[58] Field of Search ............... 359/641, 503, 726, 896, 359/631; 372/6, 101

[56] References Cited

U.S. PATENT DOCUMENTS

| | | | |
|---|---|---|---|
| 4,209,689 | 1/1980 | Linford et al. | 359/641 |
| 4,453,806 | 6/1984 | Wick | 359/641 |
| 4,704,010 | 11/1987 | Stana et al. | 359/641 |
| 4,707,053 | 11/1987 | Gurevich et al. | 359/503 |
| 4,713,825 | 12/1987 | Adsett | 372/107 |
| 4,812,025 | 3/1989 | Miller | 359/641 |
| 4,823,357 | 4/1989 | Casey | 359/618 |
| 4,938,576 | 7/1990 | Stana et al. | 359/641 |
| 4,989,217 | 1/1991 | Ostler | 372/107 |
| 5,005,973 | 4/1991 | Mimmack et al. | 359/503 |
| 5,071,239 | 10/1991 | Hoffman et al. | 359/728 |

OTHER PUBLICATIONS

M. Feldman, D. J. Mockler, R. E. English, Jr., J. L. Byrd, and J. T. Salmon, "Self-referencing Mach-Zehnder Interferometer As A Laser System Diagnostic", Active and Adaptive Optical Systems, Mark A. Ealey, Editor, Proc. SPIE 1542, pp. 490-501 (1991).

Primary Examiner—Jon W. Henry
Attorney, Agent, or Firm—Miguel A. Valdes; Roger S. Gaither; William R. Moser

[57] ABSTRACT

A thermally and mechanically stable wavefront reference source which produces a collimated output laser beam. The output beam comprises substantially planar reference wavefronts which are useful for aligning and testing optical interferometers. The invention receives coherent radiation from an input optical fiber, directs a diverging input beam of the coherent radiation to a beam folding mirror (to produce a reflected diverging beam), and collimates the reflected diverging beam using a collimating lens. In a class of preferred embodiments, the invention includes a thermally and mechanically stable frame comprising rod members connected between a front end plate and a back end plate. The beam folding mirror is mounted on the back end plate, and the collimating lens mounted to the rods between the end plates. The end plates and rods are preferably made of thermally stable metal alloy. Preferably, the input optical fiber is a single mode fiber coupled to an input end of a second single mode optical fiber that is wound around a mandrel fixedly attached to the frame of the apparatus. The output end of the second fiber is cleaved so as to be optically flat, so that the input beam emerging therefrom is a nearly perfect diverging spherical wave.

17 Claims, 3 Drawing Sheets

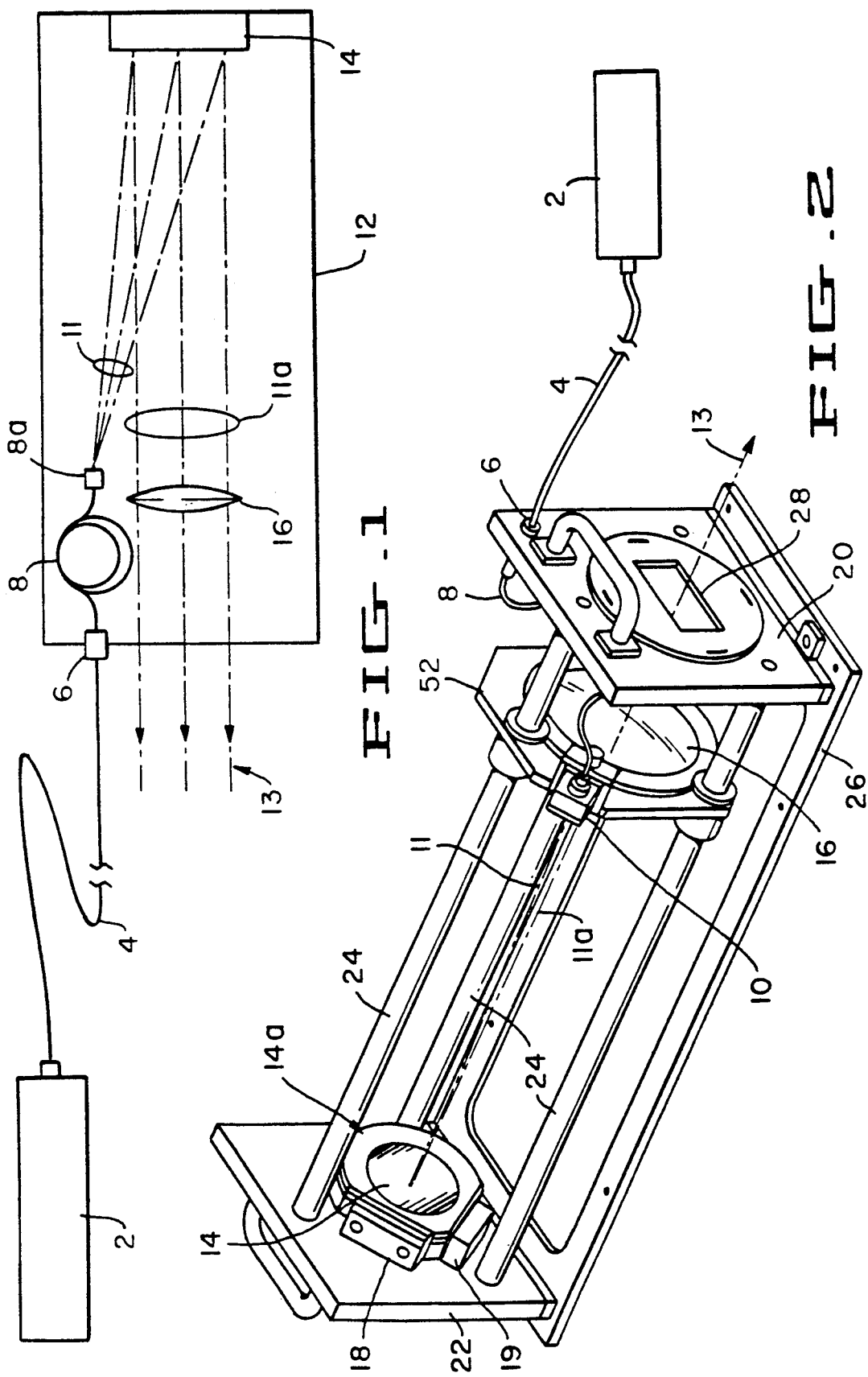

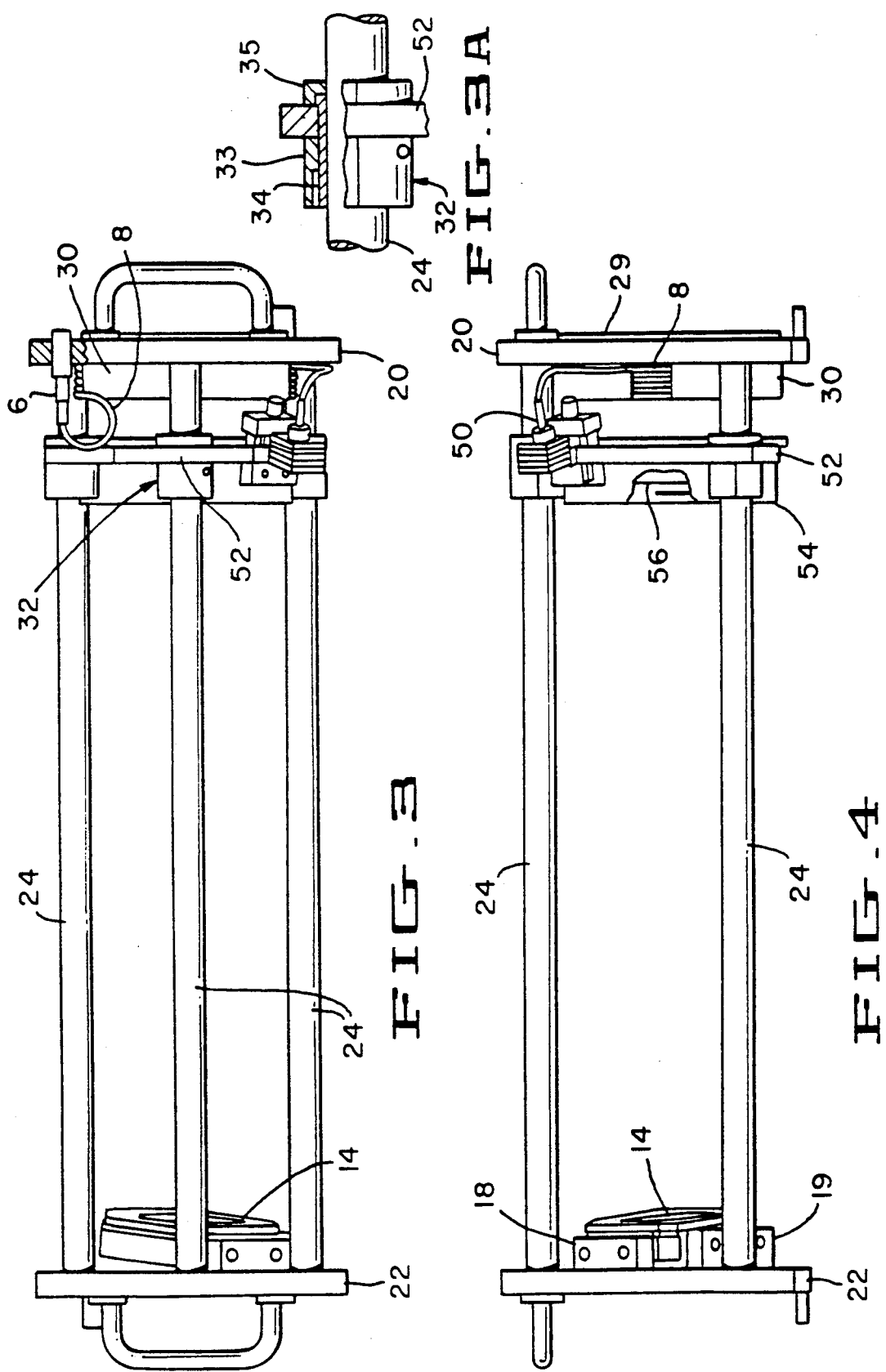

HIGH STABILITY WAVEFRONT REFERENCE SOURCE

The United States Government has rights in this invention pursuant to Contract No. W-7405-ENG-48 between the United States Department of Energy and the University of California for the operation of Lawrence Livermore National Laboratory.

FIELD OF THE INVENTION

The invention pertains to a thermally and mechanically stable wavefront reference source. More particularly, the invention pertains to a thermally and mechanically stable apparatus, which receives coherent (laser) radiation from an optical fiber, and generates reference wavefronts from the received radiation.

BACKGROUND OF THE INVENTION

Stable, substantially planar, reference wavefronts (stable, collimated reference beams of coherent electromagnetic radiation, typically having relatively large beam diameter) are needed in a variety of applications. For example, such reference wavefronts are needed for alignment and calibration of optical interferometers, and are employed in wavefront measuring systems to characterize and modify laser beams for use for laser isotope separation (and other purposes).

A thermally and mechanically stable source of reference wavefronts of this type would be useful in laser isotope separation plants, in optical testing laboratories, in adaptive optical systems, and for other research and commercial applications.

SUMMARY OF THE INVENTION

The invention is a thermally and mechanically stable wavefront reference source which produces a collimated output laser beam. The inventive apparatus receives an input laser beam from an optical fiber, and converts the input beam into a collimated output beam having larger diameter than the input beam. The output beam comprises reference wavefronts that are useful for alignment and testing of optical interferometers, as well as other applications.

The invention directs a diverging input beam of the coherent radiation from an input optical fiber to a beam folding mirror, to produce a reflected diverging beam. The reflected diverging beam is then collimated using a collimating lens.

In a class of preferred embodiments, the invention includes a thermally and mechanically stable frame comprising rod members connected between a front end plate and a back end plate. The beam folding mirror is mounted on a gimbel mount, the gimbel mount is mounted to the back end plate, and the collimating lens is mounted to the rods between the end plates. The rods are preferably made of thermally stable material such as the alloy known as Invar or the alloy known as Super Invar.

Preferably, the input optical fiber is a single mode fiber coupled to an input end of a second single mode optical fiber that is wound around a mandrel fixedly attached to the frame of the apparatus. The output end of the second fiber is cleaved so as to be optically flat, so that the input beam emerging therefrom is a nearly perfect diverging spherical wave.

Means are provided for fine alignment of the input optical fiber relative to the collimating lens.

BRIEF DESCRIPTION OF THE DRAWINGS

FIG. 1 is a simplified schematic diagram of the invention.

FIG. 2 is a perspective view of a first preferred embodiment of the invention.

FIG. 3 is a top elevational view of the FIG. 2 apparatus.

FIG. 3A is a top elevational view, partially cut away, of a rod sleeve assembly of the FIG. 3 apparatus.

FIG. 4 is a side elevational view of the FIG. 2 apparatus.

DETAILED DESCRIPTION OF THE PREFERRED EMBODIMENT

Figure 5:
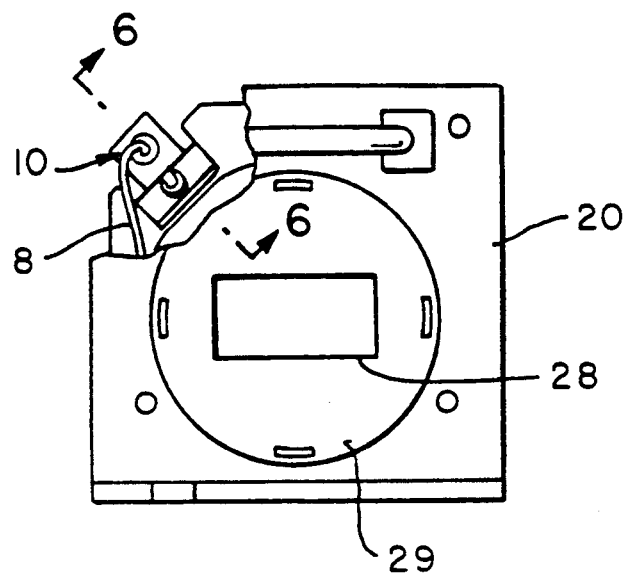
FIG. 5 is a front view, partially cut away, of the FIG. 2 apparatus.

FIG. 1 is a simplified schematic diagram of the invention. As shown in FIG. 1, the inventive apparatus includes a mode stripping means, which preferably comprises a coiled single mode optical fiber 8. The apparatus also includes a folding mirror 14 that is highly reflective of electromagnetic radiation incident on it from optically flat output end 8a of single mode optical fiber 8, and a collimating lens 16. The mode stripping means, mirror 14, and lens 16 are all mounted in a thermally and mechanically stable optical cavity means 12. Coherent radiation from laser 2 propagates through single mode optical fiber 4 into fiber 8 (fibers 4 and 8 are coupled by connector 6). The circular windings of fiber 8 will strip unwanted modes of the coherent radiation propagating through it. Output end 8a of fiber 8 is cleaved so as to be optically flat, so that a diverging, spherical, single mode input beam 11 emerges therefrom.

A diverging reflected beam 11a results from reflection of beam 11 from mirror 14. Beam 11a propagates through collimating lens 16, and is thereby collimated to produce collimated wavefront reference source output beam 13. The cross-sectional area of output beam 13 emitted from optical cavity means 12 can be varied by controlling the relative separation between mirror 14, output end 8a, and collimating lens 16, and is typically much greater than the diameter of input beam 11 emerging from fiber end 8a.

A preferred embodiment of the invention will be described with reference to FIGS. 2-6. In this embodiment, the invention includes a thermally and mechanically stable frame which comprises three rod members 24 connected between front end plate 20 and back end plate 22. Beam folding mirror 14 is mounted within gimbel mount 14a, mount 14a is mounted to back end plate 22, and spider plate 52 is slidably mounted on rods 24. Plate 52 can be clamped in a desired location along rods 24 by means to be described below. Collimating lens 16 is fixedly mounted to spider plate 52. End plates 20 and 22 are mounted to base member 26 (preferably, they are kinematically mounted to base member 26 to accommodate differential expansion between base member 26 and the optical cavity of the apparatus).

Rods 24 are preferably made of thermally stable material, which is preferably Invar alloy, Super Invar alloy, or another alloy having thermal properties similar to Invar or Super Invar. Super Invar is a well-known alloy which consists of 64% steel (having 0.2% carbon content) and 36% nickel, and has a coefficient of linear thermal expansion less than about 0.000001 per degree Celsius. End plates 20 and 22, plate 52, base 26, and mandrel 30 (to be discussed below) are typically made of stainless steel, although they can optionally be made of thermally stable material such as Invar.

Coherent radiation from laser 2 (which can be a 35 mW He—Ne laser) propagates through single mode optical fiber 4 into fiber connector 6 (which is a low loss connector), through connector 6, and is then coupled into an input end of single mode optical fiber 8. A commercially available Inter-Optics fiber connector is suitable for use as connector 6 in preferred embodiments of the invention.

Fiber 8 is wound around fiber mandrel 30 (it is wound five and a half times around mandrel 30 in one preferred embodiment), with mandrel 30 is fixedly attached to plate 20. The purpose of winding fiber 8 around mandrel 30 is to strip unwanted modes of the coherent radiation propagating through fiber 8. An output end 8a of fiber 8 (shown in FIG. 6) is cleaved so as to be optically flat, so that a nearly perfectly diverging spherical input beam 11 (shown in FIG. 2) emerges therefrom. Output end 8a is supported by source assembly 10, and source assembly 10 is attached to spider plate 52. This design ensures a fixed alignment of source assembly 10 with respect to collimating lens 16, despite translation (as a unit) of the assembly comprising spider plate 52, lens 16, and source assembly 10 along rods 24 relative to fixed end plates 20 and 22.

Figure 6:
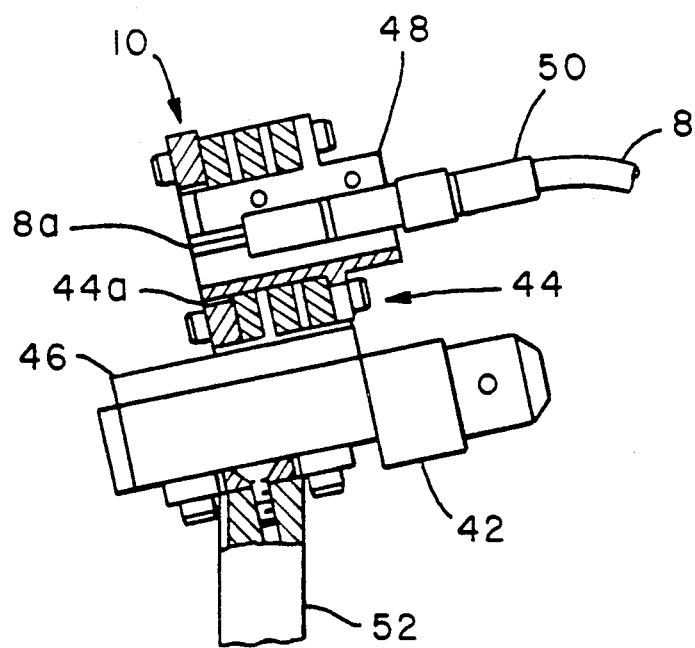
FIG. 6 is a cross-sectional view of the input beam source assembly of the FIG. 5 apparatus, taken along line 6—6 in FIG. 5.

A preferred embodiment of source assembly 10 is best shown in FIG. 6 (which is an enlarged cross-sectional partial view of the FIG. 5 apparatus, taken along line 6—6 in FIG. 5). As shown in FIG. 6, fiber chuck 50 is fitted around fiber 8 without blocking fiber 8's output end 8a. Chuck 50 is preferably lined with a Teflon coating (Teflon is a trademark of Du Pont de Nemours).

Source assembly also includes mounting member 44 (attached to an edge of spider plate 52), translation stage 42 (translatably mounted to member 44), and mounting bracket 46 (fixedly attached to stage 42). Fiber chuck clamp 48 is attached to bracket 46. Mounting member 44 includes a gimbel means 44a which enables fiber chuck clamp 48 to be pivoted with respect to bracket 46, stage 42, and plate 52.

To attach fiber 8 to source assembly 10, chuck 50 is inserted into clamp 48, and clamp 48 is then tightened (such as by screws) around chuck 50. The output end 8a of fiber 8 can be translated linearly relative to plate 52 by rotating an adjustment screw of translation stage 42.

Beam folding mirror 14 is a flat mirror mounted within gimbel mount 14a. Gimbel mount 14a is attached to back end plate 22 by top bracket 18 and side bracket 19. Plate 22 and brackets 18 and 19 can be made of stainless steel. Gimbel mount 14a is designed to permit rotational adjustment of mirror 14 relative to brackets 18 and 19 and plate 22.

To fixedly attach collimating lens 16 to spider plate 52, the lens 16 is mounted within lens ring 54, and clamp ring 56 is tightened around lens ring 54. Ring 56 is fixedly attached to plate 52. Lens 16 can be a commercially available, 150 mm diameter, air-spaced achromat having a focal length of 1219 mm.

The entire collimating lens assembly (comprising lens 16 and elements 52, 54, and 56) is connected to rods 24 by three identical sleeve clamp assemblies 32 (one clamp assembly 32 for each rod 24). Each clamp assembly 32 (as shown in FIG. 3A) includes a sleeve 34 fitted around rod 24, a sleeve holder 35 (attached to an end of sleeve 34 and to plate 52), and a sleeve clamp 33. When clamp 33 is loosened, plate 52, sleeve 34 and holder 35 are free to slide along the axis of rod 24. Clamp 33 can be tightened around sleeve 33 when desired, to clamp plate 52 in a fixed position with respect to rod 24.

Preferably, both input optical fiber 4 and fiber 8 are single mode optical fibers. Output end 8a of fiber 8 is cleaved to be optically flat, so that a nearly perfectly diverging spherical input beam 11 will emerge therefrom. Lens 16 is positioned (by loosening clamps 34, sliding plate 52 along rods 24, and then tightening clamps 34) and output end 8a is positioned relative to plate 52 (by adjusting translation stage 42 and gimbel means 44a) so that beam 11 will reflect from mirror 14 as a diverging reflected beam 11a, and so that beam 11a will propagate through collimating lens 16.

Lens 16 will collimate beam 11a, and resulting collimated output beam (wavefront reference beam) 13 will propagate from lens 16 out from the inventive apparatus through aperture 28 in apertured plate 29 (plate 29 is fixedly attached to front end plate 20). Lens 16 is preferably oriented relative to spider plate 52 so as to optimize transmitted wavefront quality.

The cross-sectional dimensions of output beam 13 transmitted through aperture 28 can be varied by varying the relative separation between mirror 14 and the spider assembly (comprising spider plate 52, source assembly 10, and lens 16. For a specific lens 16, the relative separation between mirror 14 and spider plate 52 is adjusted to optimize the output beam wavefront quality. Fine adjustment of the output beam wavefront quality is achieved by adjusting stage 42 and gimbel means 44a, and rotating gimbel 14a.

In an embodiment in which lens 16 has a 150 mm diameter and aperture 28 has dimensions 40 mm×80 mm, the mode field spot diameter of fiber 8 is preferably chosen so that the half-power points of (nearly Gaussian) beam 11a projected on lens 16 occur at a diameter of about 90 mm. The largest output beam cross-section is a rectangular beam having top-hatted intensity distribution of 40 mm×80 mm (the dimensions of rectangular aperture 28). Wavefront quality of [beam wavelength]/[12 pv] can be achieved over this rectangular cross-section.

Various modifications and alterations in the structure and method of operation of the inventive apparatus will be apparent to those skilled in the art without departing from the scope and spirit of this invention. Although the invention has been described in connection with a specific preferred embodiment, it should be understood that the invention as claimed should not be unduly limited to such specific embodiment.

What is claimed is:

1. An apparatus for generating a collimated wavefront reference beam from coherent radiation propagating within an input optical fiber, including:

a thermally stable frame;

a beam folding mirror attached to the frame;

input beam means for generating a diverging beam from the coherent radiation and directing the diverging beam to the mirror, thereby causing the diverging beam to reflect from the mirror as a diverging reflected beam; and a collimating lens mounted to the frame in a position for receiving and collimating the diverging reflected beam, thereby generating the collimated wavefront reference beam, wherein the frame includes:

a front plate;

aback plate;

means for mounting the beam folding mirror to the back plate; and a set of substantially parallel rods connected between the front plate and the back plate.

2. The apparatus of claim 1, wherein the frame also includes:

a spider plate slidably mounted on the rods, wherein the collimating lens is attached to the spider plate.

3. The apparatus of claim 2, wherein the front plate defines a rectangular aperture, and wherein the collimated wavefront reference beam propagates from the collimating lens through the rectangular aperture.

4. The apparatus of claim 2, wherein the input beam means includes a source optical fiber having a first end coupled to the input optical fiber and an optically flat output end, wherein the output end is attached to the spider plate and emits the diverging beam.

5. An apparatus for generating a collimated wavefront reference beam from coherent radiation propagating within an input optical fiber, including:

a frame having a front plate, a back plate, and a set of substantially parallel rods connected between the front plate and the back plate;

a beam folding mirror;

a gimbel mount to which the beam folding mirror is mounted;

means for mounting the gimbel mount to the back plate;

input beam means attached to the frame for generating a diverging beam from the coherent radiation and directing the diverging beam to the mirror, thereby causing the diverging beam to reflect from the mirror as a diverging reflected beam; and a collimating lens mounted to the frame in a position for receiving and collimating the diverging reflected beam, thereby generating the collimated wavefront reference beam.

6. The apparatus of claim 5, wherein the diverging beam is a single mode beam, and wherein the input beam means includes:

a mode stripping means for stripping undesired modes from the coherent radiation prior to generation of the diverging beam.

7. The apparatus of claim 6, wherein the mode stripping means includes:

a mandrel fixedly attached to the front plate; and a single ode optical fiber, having a first end coupled to the input optical fiber for receiving the coherent radiation, and an optically flat output end which emits the diverging beam.

8. The apparatus of claim 5, also including:

a spider plate slidably mounted on the rods, wherein the collimating lens is attached to the spider plate.

9. The apparatus of claim 8, wherein the front plate defines a rectangular aperture, and wherein the collimated wavefront reference beam propagates from the collimating lens through the rectangular aperture.

10. The apparatus of claim 8, wherein the front plate, the back plate, the rods, and the spider plate are composed of a thermally stable material.

11. The apparatus of claim 8, wherein the input beam means includes:

a source optical fiber having a first end coupled to the input optical fiber and an optically flat output end, wherein the output end emits the diverging beam; and a source assembly attaching the output end of the source optical fiber to the spider plate.

12. The apparatus of claim 11, wherein the source assembly includes a translation stage for translating the output end of the source optical fiber linearly relative to the spider plate.

13. The apparatus of claim 12, wherein the source assembly includes gimbel mounting means for pivoting the output end of the source optical fiber relative to the spider plate.

14. The apparatus of claim 11, wherein the front plate defines a rectangular aperture, and the collimating lens is positioned so that collimated wavefront reference beam propagates from the collimating lens through the rectangular aperture.

15. The apparatus of claim 15, wherein the rectangular aperture has dimensions substantially equal to 40 mm by 80 mm, and the collimating lens has a diameter substantially equal to 150 mm, the diverging reflected beam is substantially Gaussian, the source optical fiber is a single mode fiber, and the rods have sufficient length that the collimating lens can be positioned relative to the mirror with half-power points of the diverging reflected beam projected on the collimating lens at a diameter substantially equal to 90 mm.

16. The apparatus of claim 5, wherein the front plate, the back plate, and the rods are composed of a thermally stable material.

17. The apparatus of claim 16, wherein the thermally stable material is an alloy selected from the group consisting of Invar alloy and Super Invar alloy.

* * * * *